(12) United States Patent
Tang et al.

(10) Patent No.: US 11,933,311 B2
(45) Date of Patent: Mar. 19, 2024

(54) FAN BRAKE STRUCTURE

(71) Applicant: ASIA VITAL COMPONENTS CO., LTD., New Taipei (TW)

(72) Inventors: Chih-Cheng Tang, New Taipei (TW); Hao-Yu Chen, New Taipei (TW); Hsu-Jung Lin, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 0 days.

(21) Appl. No.: 18/138,132

(22) Filed: Apr. 24, 2023

(65) Prior Publication Data

US 2024/0044337 A1 Feb. 8, 2024

(51) Int. Cl.
| F04D 27/00 | (2006.01) |
| F16D 63/00 | (2006.01) |
| F16D 65/16 | (2006.01) |
| F16D 121/24 | (2012.01) |
| F16D 125/36 | (2012.01) |
| F16D 127/02 | (2012.01) |

(52) U.S. Cl.
CPC ........... *F04D 27/00* (2013.01); *F16D 63/006* (2013.01); *F16D 65/16* (2013.01); *F16D 2121/24* (2013.01); *F16D 2125/36* (2013.01); *F16D 2127/02* (2013.01)

(58) Field of Classification Search
CPC .............................. F04D 25/0613; F04D 27/008
See application file for complete search history.

(56) References Cited

U.S. PATENT DOCUMENTS

| 10,422,347 | B2* | 9/2019 | Sun ..................... F04D 29/522 |
| 2019/0301484 | A1* | 10/2019 | Hsieh .................... F04D 19/002 |
| 2023/0089823 | A1* | 3/2023 | Uematsu .............. H02K 7/1025 |

FOREIGN PATENT DOCUMENTS

| CN | 109488623 A | 3/2019 |
| CN | 211343408 U | 8/2020 |
| TW | I605198 B | 11/2017 |
| TW | M634605 U | 11/2022 |

OTHER PUBLICATIONS

Search Report dated Mar. 31, 2023 issued by Taiwan Intellectual Property Office for counterpart application No. 111128991.

* cited by examiner

*Primary Examiner* — Brian O Peters
(74) *Attorney, Agent, or Firm* — Brad J. Thorson; DeWitt LLP (57) ABSTRACT

A fan brake structure includes a fan and a brake device. The fan has a frame body, a fan impeller and a stator. The brake device is disposed under a bottom of a bearing cup. The brake device has a driving member, a brake member and an elastic member. The elastic member abuts against one end of the brake member. The other end of the brake member has a boss body. The driving member has a spiral rail. When the driving member rotates, the boss body moves along the spiral rail, whereby the brake member linearly reciprocally moves upward to brake the fan impeller or linearly reciprocally moves downward to release the fan impeller from the braking.

10 Claims, 5 Drawing Sheets

FAN BRAKE STRUCTURE

This application claims the priority benefit of Taiwan patent application number 111128991 filed on Aug. 2, 2022.

BACKGROUND OF THE INVENTION

1. Field of the Invention

The present invention relates generally to a fan brake structure, and more particularly to a fan brake structure, which has better braking effect and saves power consumption.

2. Description of the Related Art

It is a trend to employ a fan as a cooling unit disposed in various consumptive products for dissipating the heat generated by the products. When the temperature of an electronic product rises to an excessive value, the fan is actuated to dissipate the heat and lower the temperature of the entire electronic product. When the temperature of an electronic product is lowered to a certain value, the fan stops operating. Conventionally, in order to prevent the electronic product from burning out due to overheating, a cooling fan is generally additionally disposed in the electronic product to dissipate the heat generated by the electronic product and protect the same. In order to meet the heat dissipation requirement of the component that operates at higher and higher rate, the fan is required to rotate at higher and higher speed. As a result, after the fan is powered off, due to inertia, the high-speed operating fan will still operate for a period of time and then totally stop.

It is known that the current brake technique of the DC fan is mainly implemented by means of a circuit board. There are three types of fan brake techniques. The first one is power-on brake, which can be carried out by means of software. When powered on, the microcontroller unit (MCU) of the fan controls the H-bridge of a motor driver circuit to make the MOS transistors of two lower arms normally on. Accordingly, in operation, the multiple fan blades of the fan will create a magnetic field against the magnetic field of the magnetic band for providing a resistance and achieving braking effect. The second one is power-off brake, which is carried out by means of hardware. When powered off, the electromotive force created by the inertial operation of the fan blades is provided for the motor driver brake circuit of the hardware in the fan to make the MOS transistors of two lower arms normally on. Accordingly, in operation, the multiple fan blades of the fan will create a magnetic field against the magnetic field of the magnetic band for providing a resistance and achieving braking effect. The third one is carried out by means of electromagnetic valve-controlled brake mechanism. The fan power supply directly supplies power for the electromagnetic valve. When the fan normally operates, the electromagnetic valve is normally on, while when the fan is powered off, the electromagnetic valve loses its effect to achieve braking effect. According to such manner, the electromagnetic valve will consume power for a longer time.

Therefore, in the current fan brake technique, it is necessary to additionally design a brake circuit or mount a microprocessor with brake mode function on the original circuit board so as to achieve braking effect. However, according to the above circuit brake technique, the braking effect can be achieved only after the high-speed operating fan blades gradually stop rotating. It is impossible to make the fan blades stop rotating in short time or immediately. That is, it is impossible to shorten the braking time of the circuit brake structure from losing the power to fully stopping. As a result, it takes much time to re-start the fan to operate and dissipate the heat. Therefore, not only the working efficiency is lowered, but also the fan is quite apt to shake and self-rotate before fully stopping. This increases danger in working. Moreover, on the original circuit board of the fan are arranged many components with given functions and multiple wirings connected between the components. Therefore, it is impossible to directly add the brake circuit onto the original circuit board of the fan. The manufacturers must employ a new circuit board and redesign the circuit board so as to add the brake circuit thereon. This not only increases the use cost, but also makes the current fan brake with poor commonality in use.

SUMMARY OF THE INVENTION

It is therefore a primary object of the present invention to provide a fan brake structure, which includes a brake device having a first brake module and a second brake module drivingly connected with each other. When a fan is powered off, the second brake module can push the first brake module to engage with a shaft of the fan and lock the shaft to achieve braking effect or disengage from the shaft and release the shaft from the braking.

It is a further object of the present invention to provide the above fan brake structure, which can enhance working efficiency and reduce danger in working.

It is still a further object of the present invention to provide the above fan brake structure, which consumes power only in the brake switching process so that the power consumption is reduced and the use cost is lowered to meet the requirement for energy saving.

To achieve the above and other objects, the fan brake structure of the present invention includes a fan and a brake device. The fan has a frame body, a fan impeller and a stator. A bearing cup is vertically disposed in the frame body. The fan impeller has a shaft vertically disposed in the fan impeller and pivotally disposed in the bearing cup. The stator is fitted around the bearing cup corresponding to the fan impeller. One end of the shaft has a first restriction section. The brake device is disposed under a bottom of the bearing cup and electrically connected with a circuit board. The brake device has a driving member, a brake member and an elastic member. The elastic member abuts against one end of the brake member. The other end of the brake member has a boss body. The driving member has a spiral rail. When the driving member rotates, the boss body moves along the spiral rail, whereby the brake member is linearly reciprocally moved upward to engage with the first restriction section of the shaft and lock the shaft to brake the fan impeller or is pushed by the elastic member and linearly reciprocally moved downward to disengage from the first restriction section of the shaft so as to release the fan impeller from the braking. Accordingly, the fan brake structure can be reciprocally operated to achieve braking effect or release the fan impeller from the braking effect.

According to the above structure, when the fan is powered off, the driving member is rotated to make the boss body of the brake member slide along the spiral rail. At this time, the brake member is moved upward to engage with the first restriction section of the shaft to lock and achieve a braking effect. When the fan is again powered on, under the elastic restoring force of the elastic member, the brake member is moved downward to disengage from the first restriction section of the shaft to unlock the shaft and release the shaft from the braking effect. Under such circumstance, the fan is restored to normally operate. Therefore, the fan brake structure can be reciprocally operated to immediately achieve braking effect or release the fan impeller from the braking effect and provide better braking effect. In addition, the power is consumed only in the brake switching process so that the use cost is lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
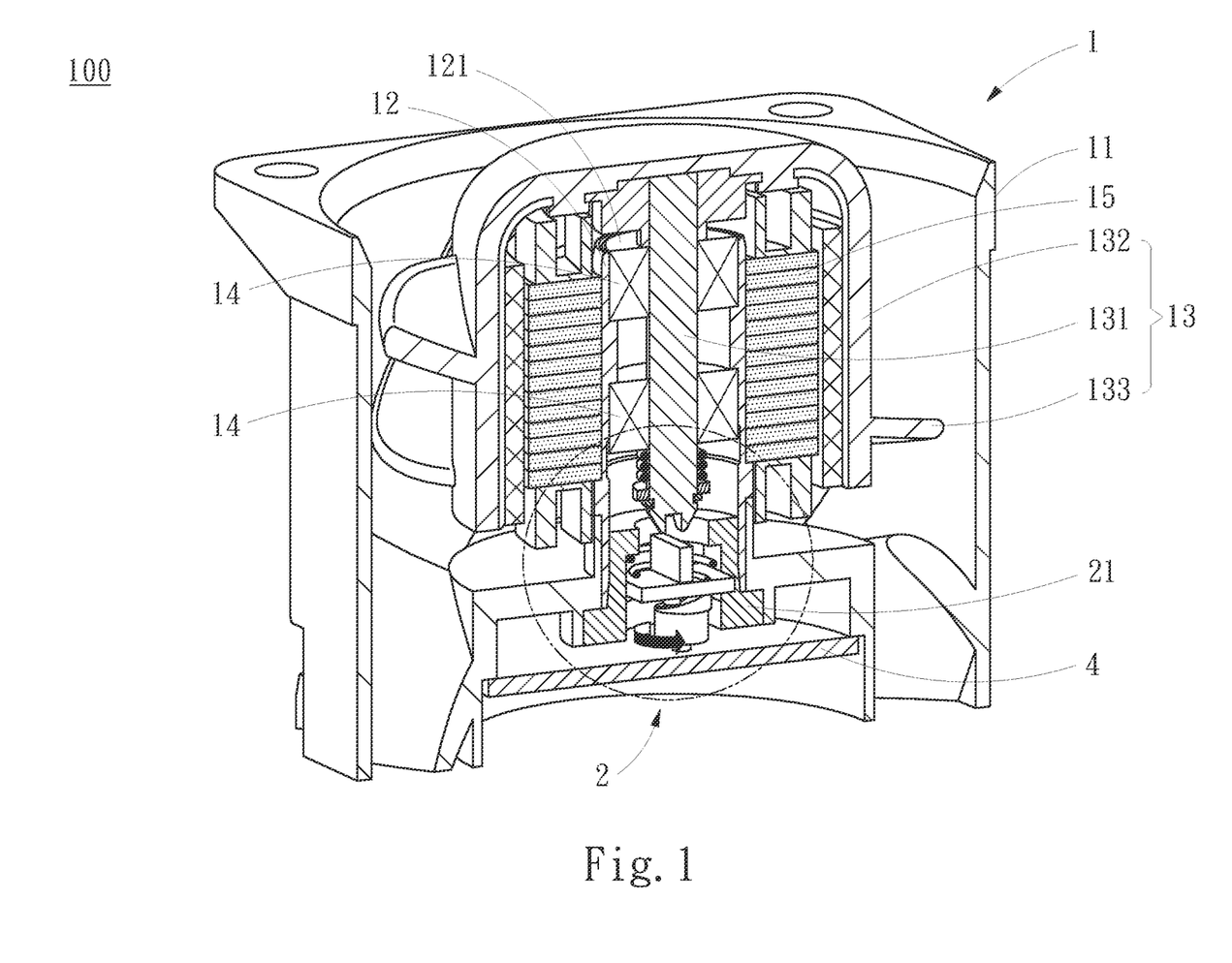
FIG. 1 is a partially sectional perspective assembled view of the fan brake structure of the present invention.
Figure 2A:
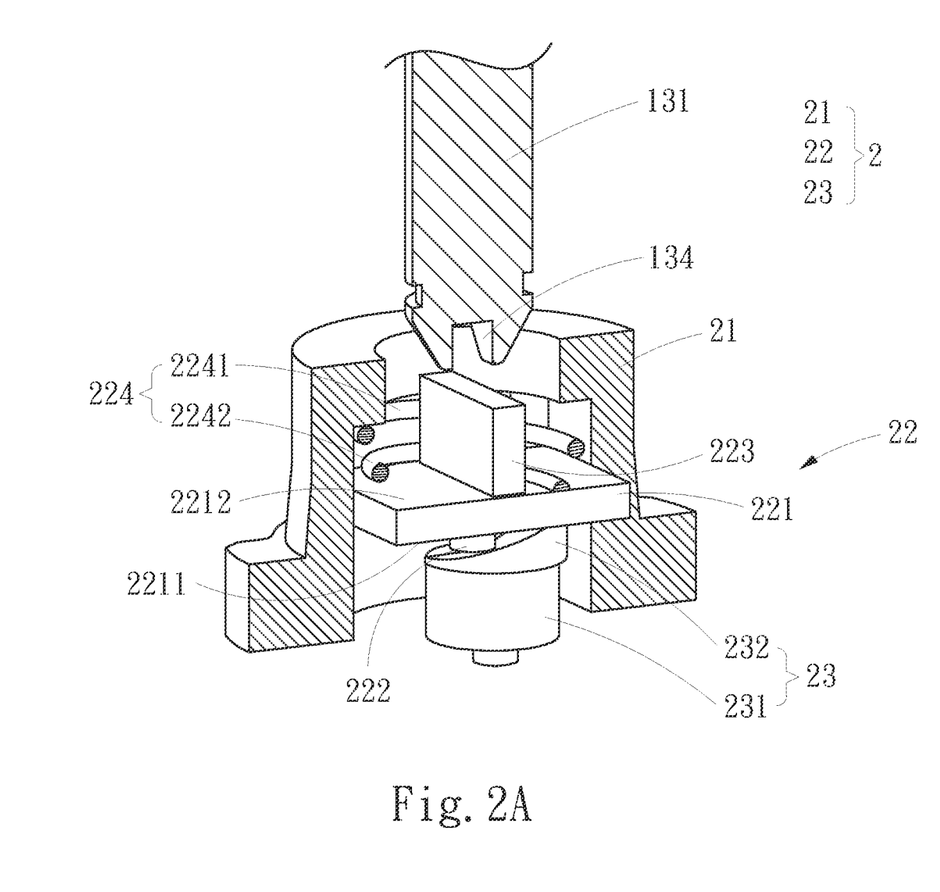
FIG. 2A is an enlarged view of circled area of FIG. 1.
Figure 2B:
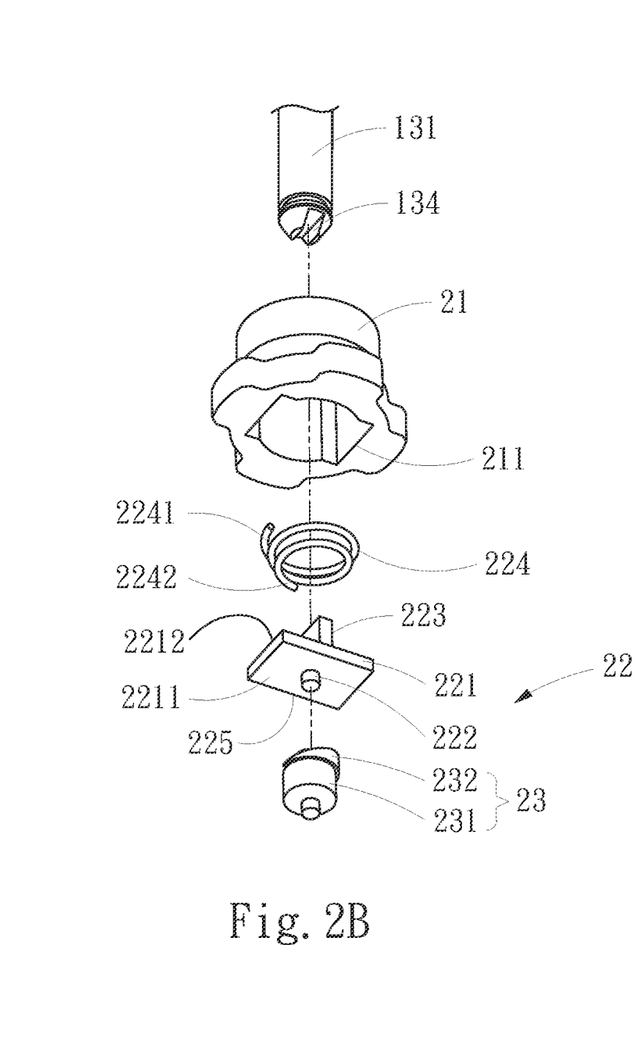
FIG. 2B is a perspective exploded view of the fan brake structure of the present invention according to FIG. 2A.
Figure 2C:
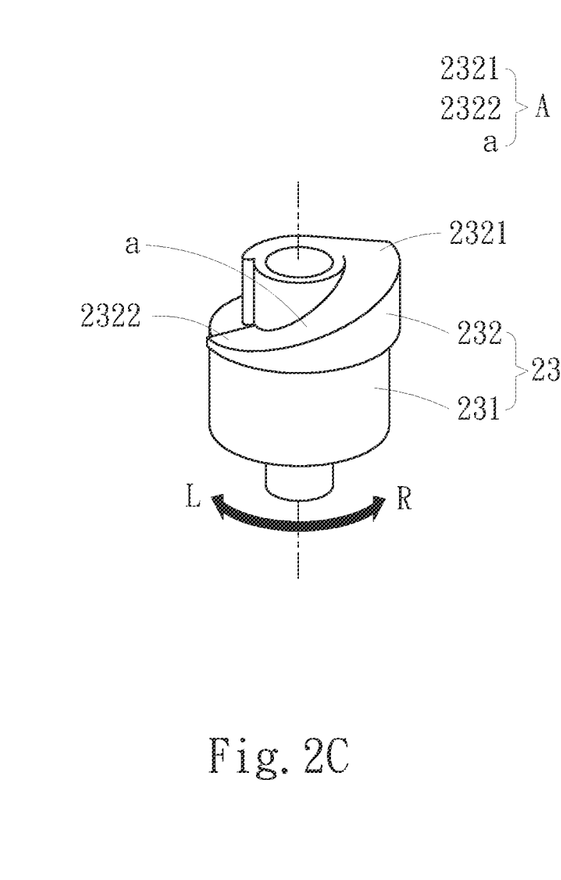
FIG. 2C is a perspective view of the driving member of the fan brake structure of the present invention according to FIG. 2A.
Figure 3:
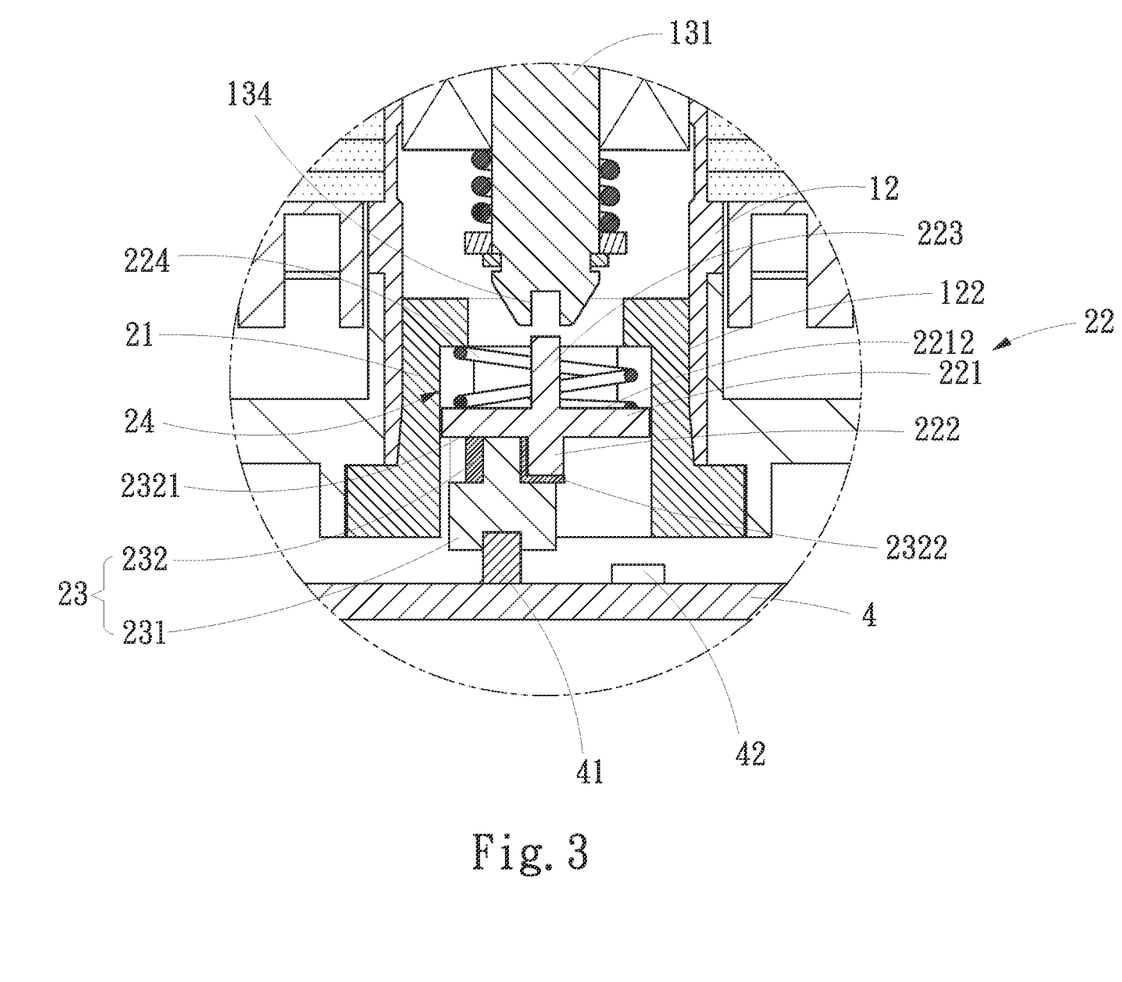
FIG. 3 is a sectional view showing the operation of the fan brake structure of the present invention in a first state.
Figure 4:
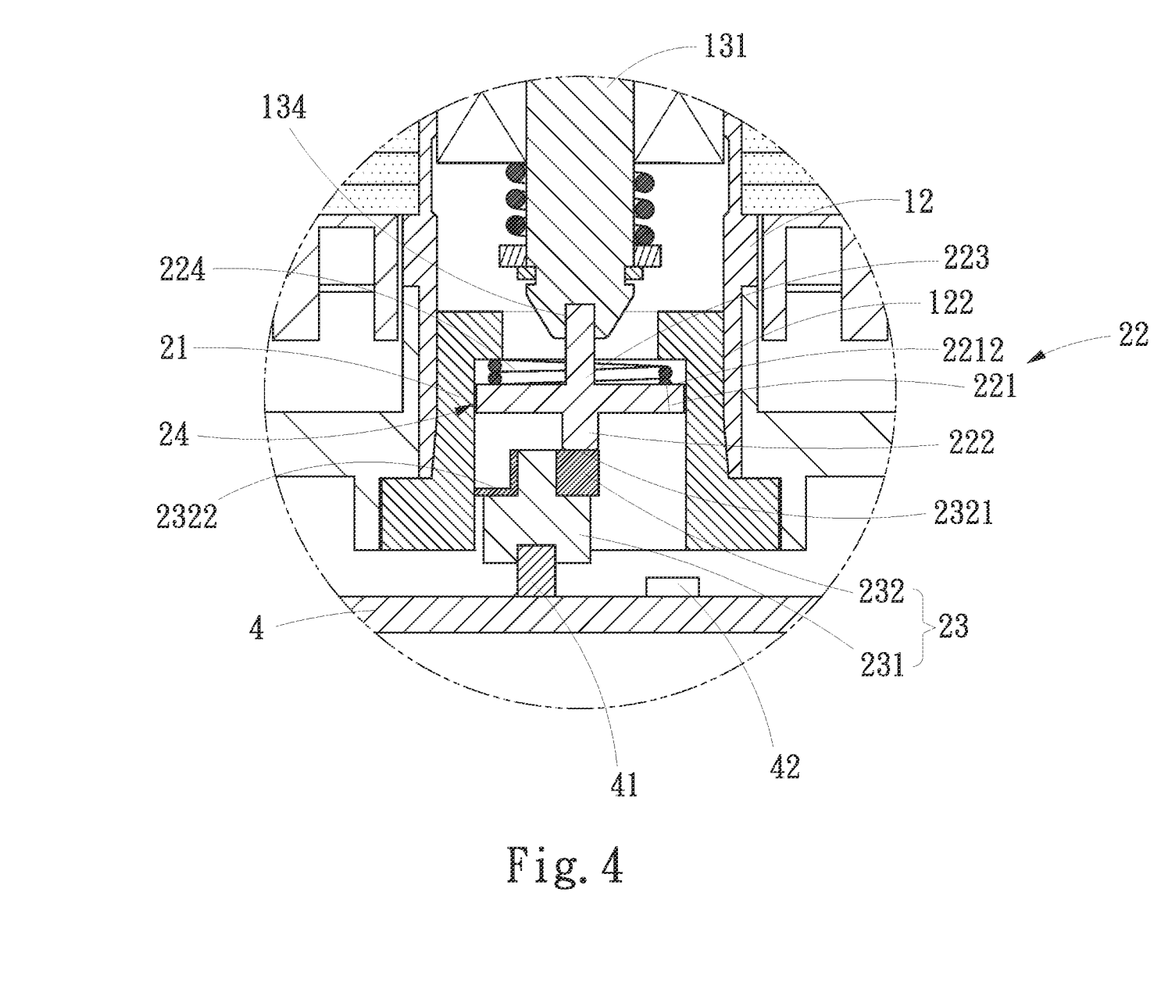
FIG. 4 is a sectional view showing the operation of the fan brake structure of the present invention in a second state.

Please refer to FIGS. 1 to 4. FIG. 1 is a partially sectional perspective assembled view of the fan brake structure of the present invention. FIG. 2A is an enlarged view of circled area of FIG. 1. FIG. 2B is a perspective exploded view of the fan brake structure of the present invention according to FIG. 2A. FIG. 2C is a perspective view of the driving member of the fan brake structure of the present invention according to FIG. 2A. FIG. 3 is a sectional view showing the operation of the fan brake structure of the present invention in a first state. FIG. 4 is a sectional view showing the operation of the fan brake structure of the present invention in a second state. As shown in FIGS. 1, 2A, 2B and 2C, the fan brake structure 100 of the present invention includes a fan 1 and a brake device 2.

The fan 1 at least includes a frame body 11, a fan impeller 13 and a stator A hollow bearing cup 12 is vertically disposed at a center of an inner side of the frame body 11. The bearing cup 12 has a first opening 121 and a second opening 122. The first opening 121 is formed at an upper end of the bearing cup 12 corresponding to the fan impeller 13 in communication with and opposite to the second opening 122. The second opening 122 is formed at a bottom end of the bearing cup 12 (as shown in FIG. 3). At least one bearing 14 is fitted in the bearing cup 12.

The fan impeller 13 is received in the frame body 11. The fan impeller 13 has a shaft 131, a hub 132 and multiple blades 133 formed on an outer circumference of the hub 132. One end of the shaft 131 is connected with and vertically disposed at a center of an inner side of the hub 132. The other end of the shaft 131, (that is, a free end of the shaft 131), is passed through the bearing 14 and pivotally disposed in the bearing 14 to extend out from the second opening 122 of the bearing cup 12. The free end of the shaft 131 is formed with a first restriction section 134. In this embodiment, the first restriction section 134 is a notch inward recessed from the free end of the shaft 131.

The stator 15 is fitted around the bearing cup 12 corresponding to the fan impeller 13.

The brake device 2 is disposed under the bottom of the bearing cup 12 and electrically connected with a circuit board 4. The brake device 2 includes a base support 21, a first brake module 22 and a second brake module 23. The base support 21 is disposed under the bottom end of the bearing cup 12 and mated with the second opening 122 thereof. The first brake module 22 and the second brake module 23 are sequentially disposed in the base support 21 from upper side to lower side. One side (upper side) of the first brake module 22 faces the free end of the shaft 131 in the bearing cup 12. The other side (lower side) of the first brake module 22 is in contact with the second brake module 23.

The circuit board 4 is disposed under the second brake module 23 and has an electrical connection section 41 and a power storage component 42. The electrical connection section 41 is such as a pin socket, a flat cable, an electrical wire or an electrical contact. The power storage component 42 is preferably a capacitor as a component for storing and releasing energy. When power is normally supplied to the fan, the power storage component 42 serves to store a preset amount of power, while when the fan is powered off, the power storage component 42 releases the stored power for the brake device 2.

To speak more specifically, as shown in FIGS. 2A to 2C, the first brake module 22 has a brake member 221 and an elastic member 224. The brake member 221 has a lower surface 2211 and an upper surface 2212. A boss body 222 is disposed under the lower surface 2211, while a second restriction section 223 is disposed on the upper surface 2212. In this embodiment, the boss body 222 of the brake member 221 longitudinally downward extends from the lower surface 2211 into contact with the second brake module 23. The second restriction section 223 of the brake member 221 is an engagement block longitudinally upward extending from the upper surface 2212 to the first restriction section 134. The engagement block serves to insert (plug) into the first restriction section 134 (the notch) of the free end of the shaft 131 or disengage therefrom.

The elastic member 224 is positioned in the base support 21 and fitted around the second restriction section 223 (the engagement block) on the upper surface 2212 of the brake member 221. In this embodiment, the elastic member 224 is a coiled spring having a first brake elastic section 2241 and a second brake elastic section 2242. The first brake elastic section 2241 is in secure contact with a neck section of an upper end of the base support 21. The second brake elastic section 2242 abuts against the upper surface 2212 of the brake member 221. In normal state, the elastic member 224 extends toward the second brake module 23 to push the brake member 221 and make the boss body 222 of the brake member 221 in contact with the second brake module 23.

Furthermore, in this embodiment, the base support 21 is formed with an internal passage 211, in which the brake member 221 is received. The brake member 221 has an outer periphery 225 in adaptation to the passage 211. The outer periphery 225 of the brake member 221 has a geometrical configuration such as rectangular shape, polygonal shape or other shape in adaptation to the passage 211 of the base support 21. Accordingly, the brake member 221 of the first brake module 22 can only vertically linearly move within the passage 211 of the base support 21. Therefore, the brake member 221 is restricted to only up and down linearly reciprocally move within the passage 211 relative to the base support 21, whereby the second restriction section 223 (such as the engagement block) can insert into the first restriction section 134 (such as the notch) of the free end of the shaft 131 or disengage therefrom.

Alternatively, in order to achieve the object that the second restriction section 223 of the brake member 221 can engage into the first restriction section 134 of the free end of the shaft 131 or disengage from the first restriction section 134, the first restriction section 134 and the second restriction section 223 can be a mortise (tenon) structure and a tenon (mortise) structure in adaptation to the mortise (tenon) structure. Still alternatively, the first restriction section 134 and the second restriction section 223 can be a socket (protrusion block) structure and a protrusion block (socket) structure in adaptation to the socket (protrusion) structure. Still alternatively, the first restriction section 134 and the second restriction section 223 can be other structures designed with geometrical configurations in adaptation to each other without specific limitation.

Please refer to FIGS. 2A to 2C. To speak more specifically, the second brake module 23 has a power member 231 and a driving member 232. The power member 231 is a motor with a rotor or any other electrically driven device. The power member 231 is electrically connected with the circuit board 4 via the electrical connection section 41. In this embodiment, the power member 231 is preferably a motor.

The driving member 232 is a cam shafted and disposed on an upper side of the rotor of the power member 231 (the electrically driven device/the motor). When the power member 231 (the electrically driven device/the motor) drives the rotor to rotate, the driving member 232 is synchronously rotated. The driving member 232 has a top surface formed with a spiral rail A. The spiral rail A has a first abutment section 2321 and a second abutment section 2322 and a spiral face a connected between the first abutment section 2321 and the second abutment section 2322. In this embodiment, the first abutment section 2321 and the second abutment section 2322 are positioned at different heights. As shown in FIG. 2C, the first abutment section 2321 is set an upper-level section, while the second abutment section 2322 is set a lower-level section, whereby the spiral face a is an inclined spiral face. When the rotor of the power member 231 drives the driving member 232 to reciprocally rotate between a first position L (such as the left side of FIG. 2C) and a second position R (such as the right side of FIG. 2C), the boss body 222 of the lower surface 2211 of the brake member 221 respectively contact the first abutment section 2321 or the second abutment section 2322 of the driving member 232. To speak more specifically, when the driving member 232 of the brake device 2 is rotated to the first position L, the boss body 222 is moved to the first abutment section 2321 (the upper-level section) and upward pushed. At this time, the brake member 221 is moved upward relative to the base support 21, whereby the second restriction member 223 is inserted (plugged) into the first restriction section 134 and the elastic member 224 is compressed (as shown in FIG. 4). On the contrary, when the driving member 232 is rotated to the second position R, the boss body 222 is moved to the second abutment section 2322 (the lower-level section). At this time, the elastic member 224 is uncompressed to apply an extending elastic force to the brake member 221 and push the brake member 221 to move downward toward the driving member 232 of the second brake module 23. At this time, the second restriction member 223 is disengaged from the first restriction section 134 (as shown in FIG. 3).

As shown in FIG. 3, in practice, when the fan 1 normally operates, the fan 1 is normally powered on via the circuit board 4 and the boss body 222 of the lower surface 2211 of the brake member 221 of the first brake module 22 is in contact with the second abutment section 2322 (the lower-level section) of the driving member 232 of the second brake module 23. At this time, the elastic member 224 is in an uncompressed state to apply an extending elastic force to the upper surface 2212 of the brake member 221 and push the brake member 221 to move within the passage 242 of the base support 21 downward toward the driving member 232. Accordingly, the boss body 222 of the lower surface 2211 of the brake member 221 abuts against the second abutment section 2322 (the lower-level section) of the driving member 232. At this time, the second restriction section 223 (the engagement block) of the upper surface 2212 of the brake member 221 is disengaged from the first restriction section 134 (the notch) of the free end of the shaft 131 without braking effect. Under such circumstance, the fan 1 normally operates.

On the other hand, with reference to FIG. 4, in the case that the fan 1 cannot detect any signal such as frequency generation (FG) signal or rotation detection (RD) signal, the fan 1 is in a power-off state. At this time, the power storage component 42 of the circuit board 4 releases power for the power member 231 to make the rotor thereof rotate. The rotor drives the driving member 232 of the second brake module 23 to rotate toward the first position L (toward the left side of FIG. 2C). At the same time, the boss body 222 of the lower surface 2211 of the brake member 221 moves along the spiral face a from the second abutment section 2322 (the lower-level section) to the first abutment section 2321 (the upper-level section), whereby the brake member 221 is pushed upward. Due to the restriction of the passage 211 of the base support 21, the brake member 221 can only move upward within the passage 211 relative to the base support 21. At this time, the upper surface 2212 of the brake member 221 compresses the elastic member 224 and the second restriction section 223 (the engagement block) of the upper surface 2212 of the brake member 221 is inserted and engaged in the first restriction section 134 (the notch) of the free end of the shaft 131 to achieve a braking effect. Accordingly, the second restriction section 223 (the engagement block) of the brake member 221 is inserted and engaged in the first restriction section 134 (the notch) of the shaft 131 to lock and brake the shaft 131. This also can prevent the fan impeller 13 from reversely rotating due to return air. Therefore, the brake structure can also achieve checking effect against reverse rotation.

Furthermore, as shown in FIG. 3, when the fan 1 is restored from the power-off state to the power-on state, the power member 231 is again powered by the circuit board 4 to rotate and drive the driving member 232 to rotate toward the second position R (toward the right side of FIG. 2C). At the same time, the boss body 222 of the lower surface 2211 of the brake member 221 moves along the spiral face a from the first abutment section 2321 (the upper-level section) to the second abutment section 2322 (the lower-level section), whereby the brake member 221 is released from the push. Also, the elastic member 224 is uncompressed to apply an extending elastic force to the upper surface 2212 of the brake member 221 and push the brake member 221 to move downward toward the driving member 232 of the second brake module 23. Due to the restriction of the passage 211 of the base support 21, the brake member 221 can only move downward within the passage 211 relative to the base support 21. At this time, the second restriction section 223 of the upper surface 2212 of the brake member 221 is disengaged from the first restriction section 134 of the free end of the shaft 131 to unlock the shaft 131 and release the shaft 131 from the braking effect. Under such circumstance, the fan 1 is restored to normally operate.

According to the design of the fan brake structure of the present invention, when the fan 1 is powered off, the driving member 232 of the second brake module 23 is rotated toward the first position L. At the same time, the boss body 222 of the lower surface 2211 of the brake member 221 of the first brake module 22 moves to the first abutment section 2321 (the upper-level section) of the driving member 232, whereby the brake member 221 is pushed and moved upward within the passage 211 of the base support 21. At this time, the second restriction section 223 of the upper surface 2212 of the brake member 221 is engaged and locked in the first restriction section 134 of the free end of the shaft 131 to provide a braking resistance. Therefore, the fan impeller 13 can be more quickly stopped from rotating. The fan brake structure of the present invention can more quickly and conveniently brake the fan impeller 13 than the conventional brake circuit. In addition, when the driving member 232 is rotated toward the second position R, the boss body 222 is moved to the second abutment section 2322 (the lower-level section) of the driving member 232 and released from the push, whereby the elastic member 224 is uncompressed to apply an extending elastic force to the brake member 221. At this time, the second restriction section 223 of the brake member 221 is disengaged from the first restriction section 134 of the free end of the shaft 131 to unlock the shaft 131 and release the shaft 131 from the braking resistance. Under such circumstance, the fan 1 can normally operate again.

Therefore, when the driving member of the present invention is rotated, the boss body of the brake member slides along the spiral rail, whereby the brake member moves upward within the base support and the second restriction section is engaged in the first restriction section of the shaft to lock and brake the shaft or moves downward within the base support and the second restriction section is disengaged in the first restriction section of the shaft to unlock the shaft. The brake member is linearly reciprocally moved up and down within the base support so that the shaft can be quickly braked or released from the braking resistance. Moreover, the power is consumed only in the brake switching process so that the power consumption is reduced and the use cost is lowered. In addition, the fan brake structure of the present invention is externally disposed in the fan so that the fan brake structure of the present invention is applicable to various series of fans with good commonality in use.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A fan brake structure comprising:
    a fan having a frame body, a fan impeller and a stator, a bearing cup being vertically disposed in the frame body, the fan impeller having a shaft vertically disposed in the fan impeller and pivotally disposed in the bearing cup, the stator being fitted around the bearing cup corresponding to the fan impeller, one end of the shaft having a first restriction section; and
    a brake device disposed under a bottom of the bearing cup and electrically connected with a circuit board, the brake device having a driving member, a brake member and an elastic member, the elastic member abutting against one end of the brake member, the other end of the brake member having a boss body, the driving member having a spiral rail, when the driving member rotates, the boss body moving along the spiral rail, whereby the brake member linearly reciprocally moves upward to engage with the first restriction section of the shaft and lock the shaft to brake the fan impeller or linearly reciprocally moves downward and the elastic member pushes the brake member to disengage from the first restriction section of the shaft so as to release the fan impeller from the braking.

2. The fan brake structure as claimed in claim 1, wherein the brake device has a power member and a base support, the base support being disposed under the bottom end of the bearing cup, the power member being disposed on a bottom section of the base support and shafted with the driving member and electrically connected with the circuit board to drive the driving member to rotate, the brake member being disposed in the base support and having a lower surface and an upper surface, the boss body being disposed under the lower surface, while a second restriction section being disposed on the upper surface for engaging with or disengaging from the first restriction section, the elastic member being disposed in the base support and having a first brake elastic section and a second brake elastic section, the first brake elastic section being securely disposed at an upper end of the base support, the second brake elastic section being disposed on the upper surface of the brake member, whereby in normal state, the elastic member extends toward the driving member to push the brake member and make the boss body of the brake member in contact with the driving member.

3. The fan brake structure as claimed in claim 2, wherein the shaft has a free end passing through the bearing cup, the first restriction section being a notch inward recessed from the free end of the shaft, the second restriction section being an engagement block outward extending from the upper surface of the brake member, whereby the second restriction section can be inserted and engaged into the first restriction section, the brake member being linearly up and down reciprocally movable relative to the base support, whereby the second restriction section can be engaged into the first restriction section or disengaged from the first restriction section.

4. The fan brake structure as claimed in claim 3, wherein power member of the brake device is a motor with a rotor, the driving member being shafted on an upper side of the power member, the spiral rail being formed on a surface of the other side of the driving member and having a first abutment section and a second abutment section, the first abutment section and the second abutment section being positioned at different heights, a spiral face being formed and connected between the first abutment section and the second abutment section.

5. The fan brake structure as claimed in claim 4, wherein when the rotor of the power member drives the driving member to rotate toward a first position, the boss body of the brake member moves along the spiral face of the drive member to the first abutment section, whereby the brake member is pushed upward and restricted to move upward relative to the base support so that the second restriction section is inserted and engaged into the first restriction section and the elastic member is compressed.

6. The fan brake structure as claimed in claim 4, wherein when the rotor of the power member drives the driving member to rotate toward a second position, the boss body of the brake member moves along the spiral face of the drive member to the second abutment section, whereby the brake member is released from the push and the elastic member is uncompressed to apply an elastic force to the brake member and push the brake member to move downward toward the driving member, whereby the second restriction member is disengaged from the first restriction section.

7. The fan brake structure as claimed in claim 2, wherein the circuit board has a power storage component, when the fan is powered off, the power storage component releasing electrical energy for the power member of the brake device to drive the driving member to rotate toward the first position, whereby the boss body of the brake member moves along the spiral rail to the first abutment section and the brake member is driven to move toward the shaft so that the second restriction member is engaged with the first restriction section to achieve locking and braking effect, the power storage component being a capacitor.

8. The fan brake structure as claimed in claim 7, wherein when the fan is powered on to operate, the driving member is driven by the power member of the brake device to rotate to the second position, whereby the boss body is moved along the spiral rail to the second abutment section so that the brake member is driven to move downward and the second restriction member is disengaged from the first restriction section of the shaft to release the shaft from the braking effect.

9. The fan brake structure as claimed in claim 3, wherein the base support is formed with an internal passage and the brake member has an outer periphery in adaptation to the passage, the outer periphery of the brake member having a geometrical configuration in adaptation to a geometrical configuration of the passage.

10. The fan brake structure as claimed in claim 1, wherein the elastic member is a coiled spring.

* * * * *